3,455,716
COATING COMPOSITION
Lewis D. Loring, Dolton, and Henry J. Voss, Homewood, Ill., assignors to Sinclair Research, Inc., New York, N.Y., a corporation of Delaware
No Drawing. Continuation-in-part of application Ser. No. 229,218, Oct. 8, 1962. This application Apr. 6, 1964, Ser. No. 357,764
Int. Cl. C23f *15/00;* C09k *3/00;* B60s *5/00*
U.S. Cl. 106—268                          9 Claims

ABSTRACT OF THE DISCLOSURE

A coating composition, useful for protecting surfaces from deterioration caused by corrosion, comprising about 25 to 75% of a mineral oil base consisting essentially of a petroleum resin having an SUS viscosity at 210° F. of about 500 to 20,000 and sufficient mineral lubricating oil to provide said mineral oil base with a viscosity of about 200 SUS at 100° F. to 1,000 SUS at 210° F., about 10 to 20% of a water-insoluble alkaline metal soap of a fatty acid having from 12 to 22 carbon atoms; about 1 to 15% of a lead soap of oxidized petroleum wax, and sufficient hydrocarbon solvent to provide a composition having an ASTM work penetration at 77° F. of about 250 to 350; wherein a combination of a polybutadiene oil and a heavy metal naphthenate may be added in an amount sufficient to increase the hardening rate of the coating.

---

This application is a continuation-in-part of application Ser. No. 229,218, filed Oct. 8, 1962, and now abandoned, which in turn is a continuation-in-part of application Ser. No. 212,451, filed July 25, 1962, and now abandoned.

This invention relates to a novel composition useful for coating surfaces to protect them from deterioration such as caused by corrosion. In a specific application, the composition is employed to undercoat automobile and other vehicle bodies to guard against corrosion.

Corrosion is the ever present enemy of motor vehicles. While great progress has been made in developing protective finishes for automobiles, the nature and location of corrosion, when it does occur, indicates that there is opportunity for even further improvement. The most serious corrosion proceeds from underneath or inside the exterior surfaces of the car. With the adoption of the unit-frame construction by nearly every car manufacturer the problem of corrosion to the underbody is being reappraised since corrosion of this unit-frame would cause a weakening of the underbody and would literally speed up a car in "falling apart." The reason is that these surfaces receive less attention from the user and are kept wet longer by splash and clinging mud which may act as a reservoir and medium of concentration for corrosive substances. Also, the underbodies usually do not receive the supplementary protective effect of waxes commonly applied by the owner to the other exterior surfaces.

During recent years there has developed the practice of applying heavy, fiber reinforced asphaltic coatings to car underbodies for the combined purposes of corrosion protection and sound deadening. These materials have not as such been capable of giving the underbody of the car the protection desired. Due to the many and varied conditions to which an automobile undercoating is subjected, the coating must withstand temperature changes such that in cold weather it should be flexible and not tend to unduly crack and chip and at high temperatures it should be non-flowing and non-tacky. Also, the coating must be able to withstand chemical attack such as from the corrosive effect of the various salt combinations used for road treatment during both summer and winter months.

The present invention is directed towards a coating composition which can be applied to surfaces using available equipment; will adhere to metal surfaces and penetrate moderate dirt or moisture accumulation; will harden in a reasonable time but remain plastic or flexible; will prevent rusting or corrosion; will have good resistance to water washing; will heal over if the film is ruptured; will not soften excessively at maximum ambient temperatures nor crack or peel at low temperatures; will not have undesirable immediate or residual odor; and will have acceptable toxicity and flammability limits.

The composition of the present invention is of grease consistency and has a heavy mineral oil resin-containing base, a thickening component comprising an essentially water-insoluble alkaline metal soap of a fatty acid, a lead salt of an oxidized wax, a light hydrocarbon solvent, for instance, boiling in the naphtha to kerosene range and, when desired, an anti-oxidant or other additive agents.

In another embodiment of the present invention, it has been found that inclusion in the coating composition of small amounts of a combination of polybutadiene oil and a heavy metal naphthenate substantially increases the rate of surface hardening of the applied coating, in most cases to two or three times the drying rate ordinarily observed, without unduly deleteriously affecting the aforementioned advantages provided by the composition.

The heavy mineral oil base is about 25 to 70% of the composition and consists essentially of a petroleum resin with or without a mineral lubricating oil. The mineral oil base as such usually has a viscosity in the range of about 200 SUS at 100° F. to 1000 SUS at 210° F., preferably about 400 SUS at 100° F. to 400 SUS at 210° F. regardless of whether it is composed of petroleum resin or a mixture of the resin and lubricating oil. This viscosity is that exhibited by the resin per se or the combined resin and lubricating oil, if any of the latter be present, even though these components may not be mixed in the absence of other agents during the actual manufacturing of the composition.

The petroleum resin fractions useful in the present composition give a hardening of the coating composition without producing brittleness upon application to a surface and drying or solvent evaporation, and the resin may be either paraffinic, mixed or aromatic based. The resins usually have a viscosity of about 500 to 5,000, or even to 20,000 preferably about 3,000 to 3,600, SUS at 210° F. The amount of petroleum resin in the composition will generally be in the range of about 5 to 70 weight percent. The resin will often not exceed about 20% of the final composition and is preferably about 10 to 15% and commensurate with the viscosity of the overall mineral oil base as previously stated. The resin fraction can be derived from a heavy paraffinic base lubricating oil stock, for instance, a residual oil such as cylinder or bright stock from a paraffinic base crude, or it may be derived from heavy petroleum distillates and lubricating oil stocks obtained from naphthenic or asphaltic base crudes and mixed, e.g. Mid-Continent, base crudes.

The paraffinic type resin fraction may be the residual material remaining after conventional solvent extraction of a heavy paraffinic base lubricating oil stock. For example, to obtain the resin a heavy residual lubricating oil fraction of a paraffinic base crude can be contacted with a solvent, such as propane, to precipitate the insoluble constituents of the lubricating oil fraction. This precipitate or extracted residue is subsequently recovered as petroleum resin. Other solvents, for instance lower alkanes such as ethane or butane, may be used to produce the petroleum resin. These paraffinic petroleum resins are characterized by their tackiness and high viscosity index, generally above about 90.

Aromatic petroleum resins are high viscosity, highly aromatic materials, for instance remaining after appropriate treatment of heavy petroleum residues or distillates and lubricating oil stocks obtained from naphthenic or asphaltic based crudes or mixed base crudes. The aromatic fractions contain the aromatic constituents of the crude oil with a minimum of paraffinic, naphthenic and asphaltic materials. The aromatic fractions can be derived by the solvent, e.g. phenol, furfural, nitrobenzene and so forth, extraction of heavy bright stocks having a viscosity of more than about 100 Saybolt Universal seconds at 210° F.; by propane or butane fractionation of the lubricating oil extracts obtained from conventional solvent treating of bright stocks lubricating oils; by vacuum distillation of the lubricating oil extracts obtained from solvent treating lubricating oils; or by chromatographic separation of heavy petroleum distillates and residuals using alumina, clay or similar earths as the adsorbent. The aromatic fractions can also be obtained using the process described in U.S. Patent 2,727,847 in which a deasphalted residual stock is treated with a selective solvent which has a high selectivity for aromatic components to separate a raw resinous fraction and in which such raw resinous fraction is fractionated at a temperature of about 100° F. to 200° F. with liquid propane, following which there are recovered a high viscosity aromatic resin from the propane insoluble phase and a deresined extract oil from the propane soluble phase. The aromatic resin fractions are often characterized by an API gravity below about 15.0° and a V.I. below about 25.

Suitable lubricating oils for our composition generally have a viscosity of about 30 to 2,000 SUS at 100° F., preferably about 75 to 750 SUS at 100° F. These mineral lubricating oils may be derived from any petroleum crude source, whether paraffinic, mixed or naphthenic in type, and may be refined by any of the refining techniques of the petroleum industry. The amount of lubricating oil present in the final composition is usually in the range of about 0 to 50, preferably about 20 to 40 percent by weight, and sufficient to obtain the desired viscosity with the resin as noted above.

Our composition is of grease consistency due primarily to the presence of an essentially water-insoluble alkaline metal soap and the proper amounts of the other components. In general, this soap will comprise about 10 to 20% of the final formulation, and preferably is about 12 to 16%. The overall composition usually has a penetration at 77° F. (ASTM worked) of about 250 to 350, preferably about 290–340° F.

The soap-forming fatty components contemplated in this invention are the saturated and unsaturated, naturally-occurring and synthetic grease-making carboxylic aliphatic fatty acids and their esters, such as the naturally-occurring or processed fats and oils which are in glyceride form, that are commonly known in the art and contain about 7 to 30 carbon atoms in the carboxylic acid group. The preferred fatty acids are the higher fatty acids that have from about 12 to 30 carbon atoms, especially those fatty or alkanoic acids that have from about 12 to 22 carbon atoms per molecule. The fatty acids normally used in the manufacture of conventional greases, particularly the saturated acids, are preferred. Suitable fatty acids include lauric, myristic, palmitic, stearic, the various hydroxy stearic acids, oleic, arachidic, behenic and the like. Naturally-occurring fatty acids such as fish oil acids, tallow acids, which contain chiefly oleic, stearic and palmitic acids, coconut oil acids, castor oil, etc., may also be utilized directly or after hydrogenation to decrease any undesirably high degree of unsaturation. Mixtures of these high molecular weight fatty acids, e.g., hydrogenated fish oil acids with oleic acid, are also operable, as are fractions obtained by distillation, extraction or crystallization. The thickening component may also be formed as a salt-soap complex containing a portion of low molecular weight carboxylic acid, e.g. acetic acid, salt as known in the art.

The alkaline, i.e. the alkali and alkaline earth, metal constituent of the fatty component reacts with the carboxylic acid source material to form the metal soap. Ordinarily the metal hydroxide or other inorganic compound is used when making the soap by reaction with the acid component. The alkaline earth metal hydroxides or carbonates such as those of calcium, barium and strontium are useful as are the alkali metal hydroxides such as lithium hydroxide. Calcium hydroxide or hydrated lime is especially preferred, although lithium also gives a useful water-insoluble soap when combined with 12-hydroxy stearic acid.

In preparing the thickening or bodying component of the present invention, the soap may be preformed but preferably is made in all or a portion of the mineral oil base. As an example, about 20 to 80 weight percent of the mineral lubricating oil of that in the final composition may be used as the soap-making medium. Thus, the grease composition can be made by mixing together the desired amount of lubricating oil, low viscosity resin or a mixture of lubricating oil and resin, with the metal base and the high molecular weight carboxylic acid and allowing these ingredients to react. The resulting grease can be dehydrated to the desired extent. In one procedure, a calcium tallow soap grease can be dehydrated to leave a small amount of stabilizing water or such grease can be essentially dehydrated and the small amount of water re-added. When making anhydrous grease intermediates, external heating can be applied within the range of about 220–500° F. until the water content is generally below about 1 weight percent and preferably below about 0.5 weight percent. When the soap is formed from a hydroxy fatty material, such as 12-hydroxy stearic acid, the heating may be applied until the water present in the grease does not exceed about 0.3 weight percent, preferably the water is about 0.01 to 0.3 weight percent, see U.S. Patent No. 2,915,467. The exact temperature range which may be used varies from one process to another depending upon different procedural steps as fully understood by those skilled in the art. When the maximum temperature is reached, heating may be discontinued and the grease batch cooled to about 250° F. Any of the conventional anti-oxidant additives, such as phenyl alpha naphthylamine, diphenylamines, alkylated amines, etc., may be added at this time, generally in amounts of about 0.1 to 2.0 weight percent and the grease is further cooled to below about 200° F. The resulting grease may then be homogenized by any of the known suitable means, such as for example, a Charlotte colloid mill.

The composition of this invention also includes a lead soap of an oxidized petroleum wax which soap exhibits excellent corrosion inhibiting characteristics and bestows surface hardening properties to the coating composition when it is present in the range of about 1 to 15, preferably about 3 to 8 weight percent, based on the final composition. The metal component forms a soap or salt with the relatively high molecular weight aliphatic carboxylic acids, esters, lactones, etc. derived from a petroleum wax by controlled partial oxidation. The mixed oxygenated hydrocarbons derived from such controlled oxidation consist fundamentally of mixtures of carboxylic acids and their esters ranging from $C_{10}$ to $C_{30}$, often averaging about $C_{18}$.

The oxidation process can be carried out in the known manner and generally comprises blowing air through the wax at elevated temperature, such as a temperature above about 250° F. The reaction is preferably carried out at temperatures in the range of about 270 to 350° F. and at atmospheric or moderately elevated pressures such as pressures up to about 200 p.s.i.g, employing air rates of about 15–35 standard cubic feet of air per hour per pound of charge. A catalyst such as potassium permanganate or potassium stearate may be present if desired.

The petroleum oxidate may be extracted with a hydrocarbon solvent such as benzene or a petroleum distillate fraction boiling in the range of about 100 to 300° F., and preferably a paraffinic hydrocarbon containing 5 to 7 carbon atoms. The solvent extraction may be carried out at ordinary temperatures or a slightly elevated temperature, employing various proportions, of oxidate and solvent usually in the range of about 1:1 to 1:4 of oxidate to solvent.

The conversion of the separated saponifiable material into the lead soap may be carried out by any convenient method, as for example by distilling off the solvent and treating the saponifiable material with, for instance, lead oxide. Since the conversion to the lead soaps may take place rather slowly, the saponification reaction may be carried out more conveniently by first saponifying with an alkali metal hydroxide and then converting the alkali metal soap to the lead soap by acidifying an aqueous solution of the soap with an inorganic acid and treating the recovered organic acids with lead oxide. Unsaponifiable matter may be removed if desired by extraction of the soap with a hydrocarbon solvent such as naphtha or benzene. The hydrocarbon solvent containing the dissolved oxidate may be extracted with an equeous solution containing sufficient alkali metal hydroxide to saponify all of the saponifiable material, and the aqueous solution of alkali metal soap obtained may then be separated from the hydrocarbon solvent which contains the unsaponifiable material. The metal soap usually contains about 3 to 15, preferably about 5 to 10 weight percent of lead based on the weight of soap.

The light hydrocarbon solvents suitable for use in the present invention include solvents boiling in the naphtha to kerosene range which evaporate upon application of the coating composition to the surface to be protected. Suitable solvents are the essentially odorless petroleum solvents such as an alkylate of isobutane and propylene. The solvent may have a gravity of about 52–56; flash (TCC) of at least 120° F.; Saybolt color of at least a minimum of +25 and good odor characteristics. A typical solvent useful in the present composition has an ASTM distillation as follows:

| | |
|---|---|
| Initial, °F. (min.) | 340 |
| Percent recovered: | |
| 10 | ------- |
| 50 | 352–370 |
| 90 (max.) | 375 |
| End point | 395–408 |
| Percent residue (max.) | 2.0 |

The solvent is generally present in the composition in amounts from about 15 to 50, preferably about 25 to 40, weight percent and in any event provides a composition of grease consistency advantageously having a penetration of about 250 to 350 as set forth above.

As previously mentioned, a combination of polybutadiene oil and a heavy metal naphthenate can be advantageously added to the composition to significantly increase the hardening rate of the film coating. The polybutadiene oils of the invention are polymers of butadiene which can contain up to about 40%, preferably up to about 25%, of styrene or other comonomer. They are mineral oil-miscible, viscous oils having a kinematic viscosity at 30° C. of about 100 to 2000 poises, preferably about 200 to 1200 poises. The polybutadiene oils are added in amounts of about 0.1 to 2%, preferably about 0.4 to 1.8%, by weight of the composition. Although the polybutadiene oil is capable by itself of reducing the hardening rate of the coating film, it was found that the use of very small amounts of a naphthenate of a heavy metal of 20 to 82 atomic number, preferably manganese, cobalt or lead, usually on the order of about .003 to 06%, preferably about 0.004 to 0.02% by weight heavy metal naphthenate based on the total composition in combination with the polybutadiene oil affects the drying activity of the polybutadiene oil so that the drying time to obtain a hard surface coating is reduced significantly, for instance in the case of cobalt naphthenate, to approximately half or less of the drying time obtainable with optiumum concentrations of the polybutadiene oils alone, yet the other properties of the composition remain satisfactory, e.g. the applied composition is not brittle. Larger concentrations of either the polybutadiene oil or cobalt naphthenate can be employed if desired but little if any further improvement has been found. Examples of suitable heavy metal naphthenates are naphthenates of lead, iron, nickel, maganese, tin, cadmium, chromium, zinc, copper, vanadium and the like. The preferred heavy metal naphthenate is cobalt naphthenate.

The polybutadiene oils can be produced by any of the well-known polymerization processes in the art such as sodium catalyzed polymerization, $BF_3$-etherate catalyzed polymerization, emulsion polymerization as well as bulk polymerization in the presence of a diluent and an organic peroxide catalyst. The polybutadiene oils can be added per se, that is, without dilution but it is preferably premixed with an equal amount of the light hydrocarbon solvent component of the coating composition in order to facilitate handling and dispersion of the product. Incorporation of the polybutadiene oil is preferably conducted after blending the other ingredients of the coating composition.

The addition of the heavy metal naphthenate can be before or simultaneously with the polybutadiene oils but preferably follows the polybutadiene oil addition. The heavy metal naphthenate can be added per se but is preferably added as a concentrate in a light hydrocarbon distillate such as kerosene.

A typical example of the composition of the present invention showing excellent properties for undercoating automobiles is prepared as follows:

EXAMPLE I

A. Preparation of calcium soap.—A calcium soap grease was formed in a steam-jacketed kettle by adding the fatty acid to the kettle and melting at 180° F. To a portion of the starting mineral oil was added a stoichiometric quantity of a hydrated lime. This mixture plus the remainder of starting oil (1 part per part fatty acid) was added to the kettle. The mixture was heated to 220° F. until it was essentially dehydrated and then a small amount of flake caustic dissolved in an equal amount of water was included. 1–2% of water was added as was the cool finishing mineral oil (balance of oil). Anti-oxidants OADA and Plexol B were incorporated and the grease was allowed to cool to room temperature. The ingredients employed included:

| Component: | Weight precent |
|---|---|
| Tallow fatty acids | 26.12 |
| Hydrated lime | 3.76 |
| Flake caustic | 0.21 |
| Refined Coastal oil, 100 SUS at 100° F | 69.91 |
| Plexol B (2,6-di-(dimethylaminomethyl)-4-octylphenol | 0.12 |
| OADA (mixture of octylated and styrenated diphenylamines) | 0.12 |

To the above calcium soap grease is added a paraffinic petroleum resin derived from a Pennsylvania base crude. The petroleum resin is heated to 180–190° F. and solwly added to the grease in the kettle. If the petroleum resin and the total mineral oil of the calcium soap grease were mixed the resultant belend would have had a viscosity of about 500 SUS at 100° F. or about 60 to 63 SUS at 210° F. The petroleum resin is characterized by a viscosity of about 3200 SUS at 210° F. and a viscosity index of 100. Stirring is continued in the kettle until the resin is thoroughly incorporated. Alox 707, an oxidized wax comprising a mixture of organic acids, lactones, esters, etc.

in which the acids have been converted to lead soaps and characterized by the following:

| | |
|---|---|
| Appearance | Dark solid |
| Melting point ° F. (min.) | 185 |
| Flash (O.C.) ° F. (min.) | 410 |
| Fire (O.C.) ° F. (min.) | 520 |
| Lead content weight percent | 7–9 |
| Acid No. | 0–10 |
| Sp. gr. at 158° F. | 1.05–1.10 | is melted and slowly added to an equal amount, by weight, of the isobutane-propene alkylate previously identified. The solvent is continually stirred until all of the Alox 707 has been added. This mixture is then slowly added and incorporated into the calcium grease/resin mixture. This mixture is thoroughly stirred and the remainder of the petroleum solvent is added to give a composition having an ASTM worked penetration of 320. The final composition analyzes as follows:

| | Weight percent |
|---|---|
| Calcium grease | 53.0 |
|    Mineral oil | 37.40 |
|    Calcium soap of tallow acids | 14.80 |
|    Water | 0.56 |
|    Anti-oxidants | 0.24 |
| Petroleum resin | 13.0 |
| Alox 707 | 4.0 |
| Petroleum solvent | 30.0 |

The coating composition possessed the following characteristics:

| | |
|---|---|
| Unworked penetration | 302 |
| Worked penetration | 320 |
| Dropping point ° F. | 202 |

The calcium soap and water of this composition may be replaced by a like or lesser amount of lithium 12-hydroxy stearate to obtain another composition of this invention.

Salt fog and humidity cabinet tests were run on the above calcium soap-containing composition. These results are reported below:

MIL–L–21260, humidity cabinet, no rust 21 days
MIL–L–3150, salt fog, no rust 72 hours Also this composition passed the ASTM D1743–60T rust test.

Steel panels sprayed with the above calcium soap-containing coating composition which have been exposed to the atmosphere for over 2 months showed no loss of coating and no evidence of rust or corrosion could be found. This composition has been applied to a number of cars. The coating has good surface characteristics and the cars have been operated on the road for several months without adversely affecting the coating and the corrosion protection it affords.

EXAMPLE II

A number of test samples were prepared by adding in each case 10 pounds of the coating composition of Example I to a 35 pound kettle. Various amounts of polybutadiene polymer oil having a viscosity at 30° C. of approximately 220 poises, as measured by Gardner-Holdt vertical tube, were added slowly at room temperature and mixed in. The polymer oil in each case was cut both with an equivalent weight of the alkylate of isobutane and propylene of the coating composition before addition to insure a more uniform dispersion. Various amounts of cobalt naphthenate as a 6% concentrate in kerosene were then added and the total charge mixed for at least one-half hour.

The final products were applied to 5" x 10" black iron panels with an airless spray gun. Day to day observations of the panels were made to determine the time required for a hard, non-tacky film to develop. This was determined by placing the panel on an incline of 15° and rolling a 60 gram steel ball and a 10 gram steel ball down the panel. Through experimentation it was found that when the balls rolled across the coated panel under their own momentum with no pickup of the undercoating, the film was satisfactory and it was given a No. 1 rating. If the balls rolled over the film but had some pickup, the film was rated No. 2. If the balls would not roll down or if they picked up all of the undercoating, the film was rated No. 3. The undercoating films always developed No. 2 and No. 1 ratings with the 60 gram ball before the 10 gram ball. This is due to the fact that the undercoating remains tacky for a short period of time after it is able to support the 60 gram ball. The momentum of the 60 gram ball is great enough so that the tackiness will not stop it. However, the film is considered satisfactory when it can be rated No. 1 with respect to the 60 gram ball since in undercoating applications, road dust will help to do away with the tackiness. The days required for the film to be rated No. 1 with respect to the 60 gram and 10 gram balls were noted.

For comparison the coating compositions without polybutadiene polymer oil and cobalt naphthenate and with polybutadiene polymer oil alone were similarly tested.

All of the preparations were also stored in 10 pound pails and examined periodically to determine any tendencies toward unusual hardening in storage because of the incorporation of the additives. The results are summarized in Table I below:

TABLE I

| | Sample Number | | | | | | | | | | | | |
|---|---|---|---|---|---|---|---|---|---|---|---|---|---|
| | 8529 | 6016 | 6017 | 6018 | 6019 | 6026 | 6022 | 6020 | 6027 | 6023 | 6021 | 6025 | 6024 |
| Composition, Wt. percent: | | | | | | | | | | | | | |
|   Coating composition of Ex. I | 100.0 | 99.8 | 99.0 | 98.2 | 98.1 | 98.9 | 99.7 | 97.8 | 98.6 | 99.4 | 97.4 | 98.2 | 99.0 |
|   Polybutadiene oil | | 0.2 | 1.0 | 1.8 | 1.8 | 1.0 | 0.2 | 1.8 | 1.0 | 0.2 | 1.8 | 1.0 | 0.2 |
|   Cobalt naphthenate (6%) | | | | | 0.1 | 0.1 | 0.1 | 0.4 | 0.4 | 0.4 | 0.8 | 0.8 | 0.8 |
|     Total | 100.0 | 100.0 | 100.0 | 100.0 | 100.0 | 100.0 | 100.0 | 100.0 | 100.0 | 100.0 | 100.0 | 100.0 | 100.0 |
| Panel Coverage [1] | (2) | (2) | (3) | (2) | (2) | (3) | (3) | (2) | (2) | (2) | (2) | (2) | (2) |
| Days to Number 1 film: [4] | | | | | | | | | | | | | |
|   With 60 gram ball | 57 | 38 | 32 | 32 | 18 | 15 | 14 | 13 | 18 | 18 | 13 | 16 | 18 |
|   With 10 gram ball | (5) | 62 | 35 | 35 | 23 | 18 | 22 | 18 | 22 | 25 | 20 | 22 | 25 |
| Storage stability [6] | (7) | (8) | (8) | (8) | (8) | (8) | (8) | (8) | (9) | (8) | (8) | (9) | (10) |

[1] Light, metal visible through coverage: Normal, metal not visible through coverage. Sixty gram ball does not leave a deep indenture when it rolls through the film on the first day; Heavy, metal not visible through coverage. Sixty gram ball leaves a deep indenture when it rolls through the film on the first day.
[2] Normal.
[3] Light.
[4] Number 1 film—when panel is placed at a 15° angle the ball will roll across the film with no pickup of product. No longer tacky.
[5] Too tacky to pass after 90 days.
[6] Tendency of the product to film over on top in storage.
[7] OK.
[8] OK 70 days.
[9] Film forming 70 days.
[10] 1/16" film 70 days.

The date of Table I demonstrate the significant reduction in time required for formation of a No. 1 film obtained by use of the combination of polybutadiene oil and cobalt naphthenate.

In the storage test, Samples 6027, 6025 and 6024 developed a surface skin after 70 days in storage. However, Sample 6021 containing the highest concentrations of both butadiene polymer oil and cobalt naphthenate had not started to skin over after 70 days. Although it would appear logical to expect greater storage surface hardening tendency with the samples containing higher additive contents, this trend is not established by the data. A possible explanation for the above observations may be that some samples were subjected to more air exposure before storage. Also the amount of material in the storage container could affect the results. No significant surface hardening in storage should occur at low cobalt naphthenate concentrations, particularly if the product container is sealed immediately after packaging.

EXAMPLE III

A number of samples identified in Table II below and prepared as in Example II were subjected to the tests described in Example II. The polybutadiene oil employed in these samples contained approximately 20% styrene and had a viscosity at 30° C. of approximately 1050 poises. The results are summarized in Table II.

20 to 40 weight percent of a mineral lubricating oil, about 10 to 15 weight percent of a paraffinic petroleum resin having a viscosity of about 3000 to 3600 SUS at 210° F. and a viscosity index above about 90, said resin and lubricating oil when mixed having a viscosity of about 200 SUS at 100° F. to 1000 SUS at 210° F., about 12 to 16 weight percent of a water-stabilized calcium soap of fatty acids having 12 to 22 carbon atoms, about 3 to 8 weight percent of a lead soap of an oxidized petroleum wax, and about 25 to 40 weight percent of a petroleum solvent boiling in the naphtha to kerosene range, said composition having an ASTM worked penetration at 77° F. of about 290 to 340.

4. The composition of claim 3 in which said resin and said lubricating oil when mixed have a viscosity of about 400 SUS at 100° F. to 400 SUS at 210° F.

5. A coating composition consisting essentially of about 25 to 70% of a mineral oil base consisting essentially of a petroleum resin having a SUS viscosity at 210° F. of about 500 to 20,000 said resin being at least about 5% of said composition, and sufficient mineral lubricating oil to provide said mineral oil base with a viscosity of about 200 SUS at 100° F. to 1000 SUS at 210° F., about 10 to 20% of a water-insoluble alkaline metal soap of a fatty acid of about 12 to 22 carbon atoms, about 1 to 15% of a lead soap of oxidized petroleum wax, about 0.1 to 2% of a

TABLE II

| | Sample Number | | | | | | | | | | | | |
|---|---|---|---|---|---|---|---|---|---|---|---|---|---|
| | 8529 | 6028 | 6029 | 6030 | 6045 | 6048 | 6038 | 6046 | 6049 | 6039 | 6047 | 6041 | 6040 |
| Composition, Wt. Percent: | | | | | | | | | | | | | |
| Coating composition of Ex. I | 100.0 | 99.8 | 99.1 | 98.2 | 98.1 | 98.9 | 99.7 | 97.8 | 98.6 | 99.4 | 97.4 | 98.2 | 99.0 |
| Polybutadiene oil [1] | | 0.2 | 0.9 | 1.8 | 1.8 | 1.0 | 0.2 | 1.8 | 1.0 | 0.2 | 1.8 | 1.0 | 0.2 |
| Cobalt naphthenate (6%) | | | | | 0.1 | 0.1 | 0.1 | 0.4 | 0.4 | 0.4 | 0.8 | 0.8 | 0.8 |
| Total | 100.0 | 100.0 | 100.0 | 100.0 | 100.0 | 100.0 | 100.0 | 100.0 | 100.0 | 100.0 | 100.0 | 100.0 | 100.0 |
| Panel Coverage [2] | (4) | (4) | (4) | (4) | (5) | (4) | (4) | (4) | (4) | (4) | (4) | (4) | (4) |
| Days to Number 1 Film: [3] | | | | | | | | | | | | | |
| With 60 gram ball | 57 | 50 | 40 | 30 | 25 | 15 | 20 | 15 | 16 | 20 | 15 | 19 | 20 |
| With 10 gram ball | (6) | (7) | (8) | 33 | 32 | 19 | 27 | 18 | 19 | 26 | 18 | 21 | 25 |
| Storage stability [9] | (10) | (11) | (11) | (11) | (12) | (13) | (14) | (12) | (13) | (15) | (13) | (14) | (14) |

[1] Containing approx. 20% styrene.
[2] Light, metal visible through coverage; Normal, metal not visible through coverage. Sixty gram ball does not leave a deep indenture when it rolls through the film on the first day; Heavy, metal not visible through coverage. Sixty gram ball leaves a deep indenture when it rolls through the film on the first day.
[3] Number 1 film—when panel is placed at a 15° angle the ball will roll across the film with no pickup of product. No longer tacky.
[4] Normal.
[5] Heavy.
[6] Too tacky to pass after 90 days.
[7] Too soft and tacky to pass after 45 days.
[8] Too tacky to pass after 40 days.
[9] Tendency of the product to film over on top in storage.
[10] OK.
[11] OK 54 days.
[12] OK 30 days.
[13] OK 40 days.
[14] OK 42 days.
[15] Film forming 42 days.

The data of Table II like that of Table I demonstrate the advantageous hardening rate obtained when employing the combination of polybutadiene oil and cobalt naphthenate.

It is claimed:

1. A coating composition consisting essentially of about 25 to 70% of a mineral oil base consisting essentially of a petroleum resin having an SUS viscosity at 210° F. of about 500 to 20,000, said resin being at least about 5% of said composition, and sufficient mineral lubricating oil to provide said mineral oil base with a viscosity of about 200 SUS at 100° F. to 1000 SUS at 210° F., about 10 to 20% of a water-insoluble alkaline metal soap of a fatty acid of about 12 to 22 carbon atoms, about 1 to 15% of a lead soap of oxidized petroleum wax and sufficient light hydrocarbon solvent boiling in the naphtha to kerosene range to provide a composition having an ASTM worked penetration at 77° F. of about 250 to 350.

2. The composition of claim 1 wherein the composition contains about 5 to 20% of said petroleum resin, about 20 to 50% of said mineral lubricating oil and about 15 to 50% of said hydrocarbon solvent.

3. A coating composition consisting essentially of about mineral oil-compatible polymer of butadiene and having a kinematic viscosity at 30° C. of about 100 to 2000 poises, about .003 to .06 weight percent of a naphthenate of a heavy metal having an atomic number of 20 to 82 and sufficient light hydrocarbon solvent boiling in the naphtha to kerosene range to provide a composition having an ASTM worked penetration at 77° F. of about 250 to 350.

6. The coating composition of claim 5 wherein the composition contains about 5 to 20% of said petroleum resin, about 20 to 50% of said mineral lubricating oil and about 15 to 50% of said hydrocarbon solvent.

7. The composition of claim 6 wherein the heavy metal naphthenate is cobalt naphthenate.

8. A coating composition consisting essentially of about 20 to 40 weight percent of a mineral lubricating oil, about 10 to 15 weight percent of a paraffinic petroleum resin having a viscosity of about 3000 to 3600 SUS at 210° F. and a viscosity index above about 90, said resin and lubricating oil when mixed having a viscosity of about 200 SUS at 100° F. to 1000 SUS at 210° F., about 12 to 16 weight percent of a water-insoluble calcium soap of a fatty acid of about 12 to 22 carbon atoms, about 3 to 8 weight percent of a lead soap of an oxidized petroleum wax, about 0.4 to 1.8% of a mineral oil-compatible polymer of butadiene containing up to about 25% styrene and having a kinematic viscosity at 30° C. of about 200 to 1200 poises and about .004 to 0.02 weight percent cobalt naphthenate and sufficient light hydrocarbon solvent boiling in the naphtha to kerosene range to provide a composition having an ASTM worked penetration at 77° F. of about 290 to 340.

9. The composition of claim 8 wherein said resin and said lubricating oil when mixed have a viscosity of about 400 SUS at 100° F. to 400 SUS at 210° F.

References Cited

UNITED STATES PATENTS

| | | | |
|---|---|---|---|
| 2,421,672 | 6/1947 | Wilson et al. | 106—14 |
| 2,815,296 | 12/1957 | Young et al. | 106—285 X |
| 2,816,842 | 12/1957 | Westlund et al. | 106—14 |
| 2,843,548 | 7/1958 | Westlund et al. | 106—14 |

FOREIGN PATENTS 667,042   2/1952   Great Britain.

OTHER REFERENCES

Condensed Chemical Dictionary, 6th ed., Reinhold Publishing Company, New York; pp. 755 and 871. QD 5 C5 (1961) C. 34.

JULIUS FROME, Primary Examiner

J. E. EVANS, Assistant Examiner

106—14, 269, 271, 278, 279, 285; 117—132, 134, 135, 167, 168; 148—6; 252—389, 396